Dec. 13, 1938.    W. KOPMANN    2,139,830
BAKER'S MOLD
Filed Aug. 17, 1937
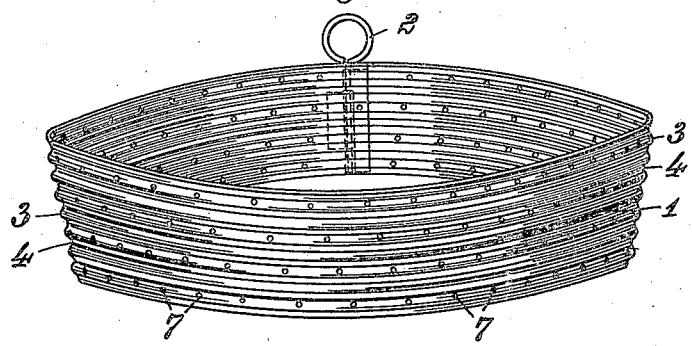
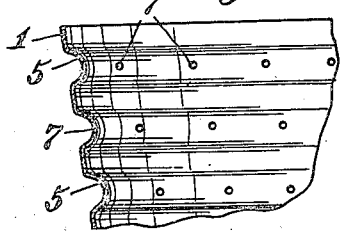
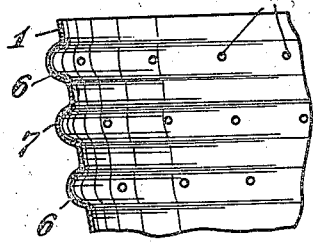
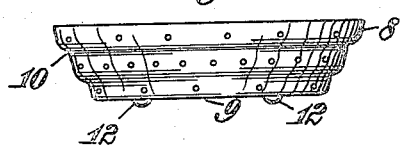
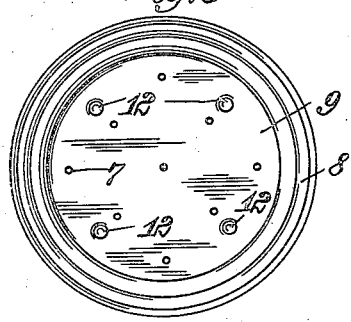
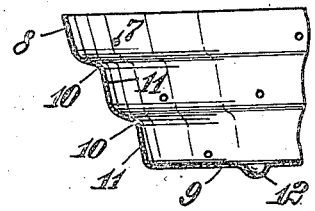
Inventor:
Wilhelm Kopmann,
Attorneys Patented Dec. 13, 1938

2,139,830

UNITED STATES PATENT OFFICE 2,139,830

BAKER'S MOLD

Wilhelm Kopmann, Berlin-Lankwitz, Germany

Application August 17, 1937, Serial No. 159,589
In Germany September 22, 1936

3 Claims. (Cl. 53—6)

The known molds or rings used in baking so-called flans or surrounds consist as a rule of a cylindrical sheet metal annulus, which is applied to a suitable underlay, for example, directly on a baking tray.

With these known constructions it is difficult or impossible to bake such flans or surrounds to any desired height as the dough applied in the form of a lining to the annulus is liable to slip down the periphery of the mold, especially if the dough is of thin consistency.

A further drawback experienced in the use of such molds in bakeries is that the gases evolved in the baking operation are unable to escape directly so that there is a tendency to the formation of bubbles in the dough, which detracts from the appearance of the baked goods.

The invention aims to overcome these drawbacks and consists broadly in the feature that the periphery of the mold, of truncated formation, is provided over its entire breadth with wavelike depressions and elevations or corrugations presenting retaining faces which extend parallel to the edge of the mold, and which are provided with apertures for the escape of gases evolved in the baking operation. The form of the wavelike depressions and elevations serving as retaining faces for the dough may be varied. In lieu of simple corrugations, beads or joggles of selected form extending parallel to the edge may be applied to the metal sheet.

In order to permit the use of molds of truncated conical form free from joints, particularly for use in molding tarts or tart shells, and to facilitate discharge of the baked goods without injury, the internal boundaries of the retaining faces may be so formed that they taper in the direction opposite to the direction of discharge of the baked goods.

A further feature of the invention resides in the formation of the base of the tart mold with orifices which permit discharge of gases evolved in the baking operation, the base of the mold being also provided with projections which serve as bearing faces for the mold, whereby during the baking operation the base of the mold is spaced from the baking tray or the like.

Several embodiments of the invention are illustrated in the accompanying drawing in which Fig. 1 is a perspective view of an annular mold according to the invention.

Figs. 2 and 3 are fragmentary views showing alternative forms of the retaining faces.

Figs. 4 and 5 are, respectively, an elevation and a plan of a mold for use in baking tarts or tart shells.

Fig. 6 is a fragmentary sectional view to a larger scale of the mold shown in Figs. 4 and 5.

In the embodiment illustrated in Fig. 1 the mold consists of a sheet metal shell 1 in the form of a truncated cone open on top and bottom and adapted to be rested on a suitable underlay. The sheet metal shell is split at one point and provided at the abutting edges with fastening means which may be of known type, consisting for example, of a pin 2 engaging apertured lugs. To remove the baked article from the mold, the pin 2 is withdrawn and the abutting edges separated slightly to expand the mold.

It will be seen from Fig. 1 that the sheet metal shell 1 is provided on its inner face with retaining faces in the form of depressions and elevations. These retaining faces prevent, paticularly in the handling of varieties of dough of thin consistency, downward slip of the mass of dough, and render it possible to bake flans or surrounds of suitable height without scrap.

In the form shown in Fig. 1 the sheet metal shell 1 is provided with regular corrugations in which the crests 3 and the troughs 4 extend parallel to the upper and lower edges of the dough. This form is convenient for manufacture and has been found experimentally to give approved results in practical use.

In the modification shown in Fig. 2, the retaining faces are formed by inwardly pressed beads or joggles 5 extending parallel to the upper and lower edges of the shell 1 and suitably spaced apart.

In the embodiment shown in Fig. 3 the spaced parallelly extending beads or joggles are pressed outwardly.

The invention is not confined to the particular formation of retaining faces illustrated in the drawing.

As shown in Figs. 1 to 3 there are provided in the region of the retaining faces, preferably at the summits of the elevations, small apertures 7 which permit escape of gases evolved in the baking operation whereby the formation of bubbles is prevented. These apertures are preferably staggered in the several retaining faces. Their circumferential distance apart should not exceed 1 or 1½ centimeters.

Molds such as above described can be simply and inexpensively manufactured in respect that the retaining faces and the apertures may be formed in a press acting on the metal sheet before it is shaped to truncated conical form.

Figs. 4 to 6 show the adaptation of the invention to a mold for use in baking tarts.

With the molds heretofore used the baker had to reckon on wastage of about 20% of the dough used, whereas by the invention it is possible to produce perfect baked articles without such wastage and with economy of labour.

The mold shown in Figs. 4 and 5 consists of a truncated conical shell 8 closed by a bottom wall 9 at the part of less diameter. On the inner faces of the shell 3 there are provided retaining faces in the form of spaced parallel beads or joggles 10. These retaining faces are in this embodiment given a shape adapted to permit discharge of the baked product by inverting the mold, without damage to the baked product, being so formed that, when the mold is inverted, its cross-sectional area increases progressively downwards.

The base 9 of the mold is provided with a number of small orifices 7 which permit escape of gases evolved in the baking operation in the region of the bottom of the tart shell.

The base 9 has at least three (in the example four) pips or wart-like projections 12 which present bearing faces. Due to the provision of these projections 12 a small interspace is left between the base of the mold and the baking tray, so that gases evolved in the bottom of the baked product during the baking operation can escape without hindrance.

I claim:—

1. A baker's mold for crust dough edgers or pans comprising a shell of sheet metal of truncated conical form, the periphery of said shell being provided over its entire breadth with wave-like depressions and elevations extending parallel to the edge of said mold, said shell being formed with gas-escape apertures, said depressions and elevations preventing slippage of crust dough downwardly with respect to the mold.

2. A baker's mold for crust dough edgers or pans as claimed in claim 1, the periphery of which is provided with beads or joggles extending parallel to the edge of the mold.

3. A baker's mold for crust dough edgers or pans comprising a shell of sheet metal, of truncated conical form, the periphery of said shell being provided over its entire breadth with wave-like depressions and elevations extending parallel to the edge of the said mold, the internal face of said periphery tapering progressively in the direction towards the apex of the cone, the periphery and the base of said shell being formed with gas-escape apertures, the base of said mold being provided with a plurality of spaced wart-like projections having gas-escape apertures therein, said depressions and elevations preventing slippage of crust dough downwardly with respect to the mold.

WILHELM KOPMANN.